United States Patent [19]

Baxter

[11] Patent Number: 4,789,589

[45] Date of Patent: Dec. 6, 1988

[54] INSULATED ELECTRICAL CONDUCTOR WIRE AND METHOD FOR MAKING SAME

[75] Inventor: Gordon D. Baxter, Kingston, Canada

[73] Assignee: Northern Telecom Limited, Montreal, Canada

[21] Appl. No.: 145,003

[22] Filed: Jan. 19, 1988

[51] Int. Cl.[4] .......................... B32B 1/08; B32B 3/26; B29C 47/06; H01B 7/00

[52] U.S. Cl. .............................. 428/317.5; 174/110 F; 264/45.9; 428/318.6; 428/318.8; 428/319.7; 428/375; 428/376; 428/379; 428/383; 428/398

[58] Field of Search ............... 428/319.1, 319.7, 318.6, 428/318.8, 314.4, 314.8, 317.5, 375, 376, 379, 383, 398; 264/45.9; 174/110 F

[56] References Cited

U.S. PATENT DOCUMENTS

| | | | |
|---|---|---|---|
| 4,037,020 | 7/1977 | Ishii et al. | 428/518 |
| 4,093,414 | 6/1978 | Swiatovy, Jr. | 264/45.9 |
| 4,310,597 | 1/1982 | Checkland | 428/372 |
| 4,547,328 | 10/1985 | Yuto et al. | 264/45.9 |

FOREIGN PATENT DOCUMENTS

| | | |
|---|---|---|
| 952991 | 8/1974 | Canada . |
| 1111175 | 10/1981 | Canada . |
| 938825 | 10/1963 | United Kingdom . |

*Primary Examiner*—William J. Van Balen
*Attorney, Agent, or Firm*—R. J. Austin

[57] ABSTRACT

A conductor wire with an inner layer of insulation of cellular polyolefin compound and an outer layer of polyvinylchloride. The polyvinylchloride includes a material compatible with the polyolefin and which bonds to the polyolefin to bond the layers together. The compatible material may be chlorinated polyethylene. In the insulated structure, the inner layer has a substantially continuous skin which is bonded to the outer layer. In a method of forming the insulation, the inner layer is maintained as a non-cellular structure which the outer layer is extruded onto it. This provides unbroken opposing surfaces of the layers which are bonded together and the integrity of the surface of the inner layer is maintained as the layer is formed into a cellular structure.

4 Claims, 1 Drawing Sheet

INSULATED ELECTRICAL CONDUCTOR WIRE AND METHOD FOR MAKING SAME

This invention relates to insulated electrical conductor wire.

In insulation for electrical conductor wires, a variety of materials is used. These include compositions of polyvinylchloride, polyethylene, polyolefin and other polymeric materials such as polyamides. Insulation may be provided in two or more layers on a conductor, each layer providing certain suitable electrical and/or mechanical characteristics. A recent example of a double layer of insulation upon a conductor wire is as described in U.S. Pat. No. 4,310,597, granted to a J.A. Checkland, et al on Jan. 12, 1982. This construction has an inner layer of polyolefin insulation surrounded by an outer layer of irradiated polyvinylchloride which provides abrasion and heat resistance for a wire construction for use in switchboard and main frame wiring. It is also known to provide two insulation layers in which one of the layers is formed as a cellular material. Examples of such a structure are given in Canadian Patent No. 952,999, granted Aug. 13, 1974 to D.A. Costello and R. MacLean. The materials of both layers of insulation as described in the above Canadian patent are polyolefins.

Problems have been found to arise when using two insulation layers on a conductor wire and in which the inner layer is of polyolefin cellular structure and the outer layer is of solid (i.e. non-cellular) polyvinylchloride. These problems arise when the polyvinylchloride layer has extreme thinness, i.e. below a thickness of 0.005 inches, and is also uncured. In such a structure, the thickness of the cellular inner layer may be greater than that of the outer layer to obtain certain desired electrical characteristics, minimizing the outside diameter of the insulation to produce a smaller diameter cable for a given number of conductors than is possible when using completely non-cellular insulation. Such a structure saves on the materials used, particularly where curing is not required, in situations where abrasion resistance of the polyvinylchloride is not an essential requirement ment, but where fire resistance is still of prime importance. These structures may conveniently be used, for instance, in riser cables or in terminating cables inside buildings and in which, the reduced diameter cables may assist in passing them through certain space restrictions. During processing in the manufacture of such structures, the outer layer is extruded over the inner layer. As the insulated conductor bearing its two insulation layers is moved along its passline, it has been found that an outer layer with a maximum thickness of 0.005 inches is too flimsy and weak to be able to withstand constantly the rigors of the further processing steps without being ripped apart and separating from the cellular layer beneath. In particular the outer layer is unable to withstand movement of the insulated conductor around guide pulleys during reeling of the product. It has also been found that the outer layer tends to tear during customer installation. The problem is aggravated as the cellular volume increases in the cellular layer. Further, it is exceedingly difficult and sometimes impossible to increase the cellular volume above 50% and up to 80% of the total volume of the inner layer. If such high percentage cellular structures were achievable, this would minimize the strength and retention of the outer layer upon the inner layer.

The present invention seeks to provide an insulated conductor wire which overcomes the above problem. The present invention also provides a method of making such a wire.

Accordingly, the present invention provides an insulated conductor wire comprising a conductor wire and a surrounding insulation comprising an inner layer of a polyolefin compound and of cellular construction and an outer layer with a maximum thickness of 0.005 inches and of a non-cured and non-curable polyvinylchloride base compound which includes a material compatible with the polyolefin of the inner layer, the inner layer having a substantially continuous skin which is bonded to the compatible material to bond the two layers together.

The present invention is thus dependent upon the realization that the problem of separation of the thin uncured polyvinylchloride compound outer layer from the inner layer may be overcome by adhering the layers together even though the inner cellular layer provides only a small area for contact with the polyvinylchloride layer at the interfacial regions of the layers. The contact area between the two layers decreases as the cellular volume of the inner layer increases. However, it has been found that the bond between the layers is still effective to retain the outer layer in position even though the cellular volume of the inner layer may increase up to 80% of the total volume of the layer or beyond.

According to the invention also, there is provided a method of forming an insulated conductor comprising extruding onto the conductor as an inner layer of non-cellular structure, a molten polyolefin composition including a material which is expansible as a gas, upon removal of the extrusion pressure, to form the inner layer into a cellular structure; maintaining the material of the inner layer under extrusion pressure while extruding around it an outer layer of a molten non-curable polyvinylchloride composition including a desired amount of a material compatible with the polyolefin inner layer, the inner and outer layers intimately engaging one another along unbroken opposing surfaces with the material compatible with the inner layer bonding to the inner layer to form a bond between the layers throughout the area of the opposing surfaces; and reducing the pressure upon the two layers to cause the inner layer to form into a cellular structure while substantially maintaining the integrity of the surface of the inner layer and the bond throughout the areas of the opposing surfaces.

It is an essential requirement of the present invention that the two layers should have the continuous overall contact at their interfacial regions before the cellular structure is formed. This is to maximize the degree of bond between the layers.

A typical compatible material forming part of the polyvinylchloride compound is a chlorinated polyethylene. This preferably exists in the composition between 10% and 20% by weight of the polyvinylchloride resin material.

One embodiment of the invention will now be described, by way of example, with reference to the accompanying drawings, in which.

Figure 1:
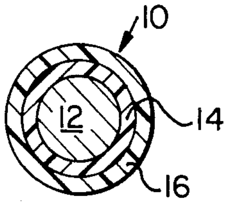
FIG. 1 is a cross-sectional view through an insulated conductor according to the embodiment.

In the embodiment, an insulated conductor 10 for use as a riser cable inside a building comprises wire conductor 12 of 26 AWG, the conductor surrounded by an inner cellular layer 14 of a polyolefin, e.g. polyethylene, and an outer layer 16 of polyvinylchloride composition. In the structure, each of the layers 14 and 16 is of approximately 0.003 inches thick to provide the electrical properties desired for the insulated conductor. The layer 16 is formed from a polyvinylchloride composition so as to provide fire retardancy characteristics as required within buildings. The polyvinyl composition is both uncured and uncurable, i.e. it contains no substances which will enable it to be cured, thereby minimizing the cost in the outer layer.

The outer layer has the composition shown in the following Table.

| INGREDIENTS | BREAKDOWN percent (wt) |
|---|---|
| PVC resin | 100.00 |
| Plasticizer DOP | 35.00 |
| Calcium Carbonate | 10.00 |
| Dibasic Lead Phthalate | 6.00 |
| Thermoguard CPA or Antimony Trioxide | 5.00 |
| CPE Tyrin 3615 | 10.00 |

As may be seen from the above formulation, the polyvinylchloride composition contains a certain amount of chlorinated polyethylene (CPE as referred to above). In the composition of the embodiment, chlorinated polyethylene is included as 10% by weight of the PVC resin material. Satisfactory results have also been found however with chlorinated polyethylene up to amounts of 20% by weight of the PVC resin. For best results, the chlorinated polyethylene should have no more than 15% by weight content of chlorine.

As a result of the bonding, it has been found that the outer layer 16, although being extremely thin, shows no tendency to separate from the inner layer during subsequent handling and processing, subsequent to formation of the layers, such as for instance by passage of the insulated conductor around pulleys or guide wheels as it is fed onto reeling apparatus.

The bond between the two layers helps to control the formation of cells in the inner layer such that, even with the formation of 80% or more of cellular volume in the inner layer, the inner layer has a substantially continuous skin which is bonded to the outer layer. While the inner layer is of a foam composition, with perhaps a volumetric quantity of air spaces up to 80% of the total volume of the inner layer, there is sufficient bond between the layers to prevent the outer layer from separating and ripping away from the inner layer during subsequent handling. However, the substantially continuous skin of the inner layer maximizes the area of bond between the layers and thus maximizes the degree of bond.

Figure 2:
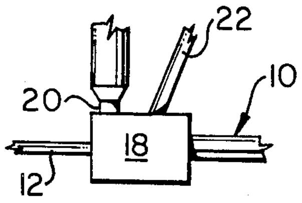
FIG. 2 is a diagrammatic side elevational view of an extruder during the application of two insulation layers to the conductor.
Figure 3:
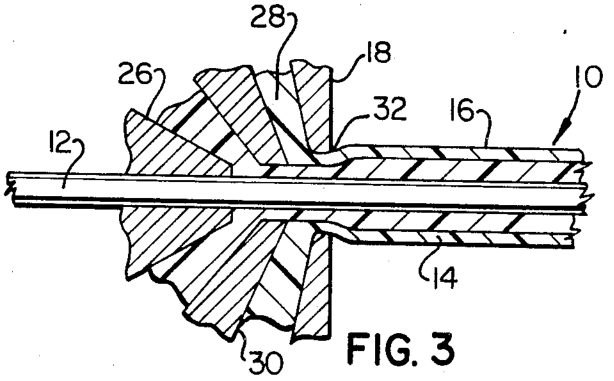
FIG. 3 is a cross-sectional view through part of the extruder shown in FIG. 2 and to a larger scale, to show the two layers of insulation being added around the conductor.

As shown by FIG. 2, the conductor 12 is fed through a dual extruder head 18 in which it is provided with both the inner and outer layers to produce the resultant insulated conductor 10. In FIG. 2, the molten polyolefin composition is fed along inlet 20 and the molten polyvinylchloride composition along inlet 22. FIG. 3 illustrates the application of both the layers to the conductor 12. As shown by FIG. 3, the molten polyolefin material 24 is forced under extrusion pressure along inlet 20 into an annular passageway 26 of the head 18 and onto the conductor 12 to form the inner layer 14*a* in non-cellular form. The polyethylene contains either a chemical blowing agent or an injected gas blowing agent which expands to form the cellular structure of the layer 14. Formation of a cellular structure in this manner by reduction of pressure is well known in the art of closed cellular foam constructions and need be described no further.

Figure 4:
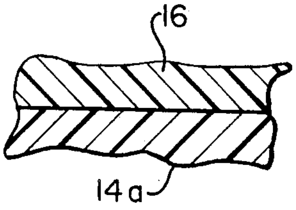
FIG. 4 is on an enlarged scale and is a cross-sectional view showing the contacting layers of insulation before removal of extrusion pressure.

As shown by FIG. 3, in the dual extrusion head 18, the conductor bearing the non-cellular inner layer 14*a* and still under extrusion pressure then passes downstream so as to be surrounded by the molten polyvinylchloride composition 28 which is flowing under extrusion pressure through an annular passageway 30 of the head which surrounds the passline for the conductor and is interconnected to inlet 22. This produces the outer layer 16. The non-cellular inner layer 14*a* is contacted by the outer layer over an unbroken overall surface contact area of the inner layer (FIG. 4) thereby maximizing the area of bond between the layers caused by bonding of the chlorinated polyethylene with the polyolefin of the inner layer.

Figure 5:
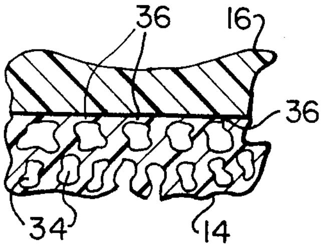
FIG. 5 is a view similar to FIG. 4 and shows the insulation after removal of the extrusion pressure.

Immediately the insulated conductor leaves the extrusion orifice 32, there is a small increase in outside diameter as shown by FIG. 3. This diameter increase is caused by the formation of the cellular structure in layer 14*a* to make layer 14 due to the sudden reduction in the extrusion pressure. However, although the cells are formed, e.g. cells 34 in FIG. 5, the bond between the two layers resists any tendency for cells to break through the outer surface of the inner layer so that a substantially continuous surface 36 is still maintained by the inner layer and this surface is securely bonded to the chlorinated polyethylene of the outer layer so as to hold the layers bonded together throughout the surface area. Thus, substantially the whole area of bonded contact between the layers is maintained after cell formation. This bond has a strong control on the cellular structure during its formation whereby it contains the inner layer and enables acceptable cell formations of up to 80% and above by volume of the inner layer while still maintaining skin integrity on the inner layer and still ensuring maximum bond between the two layers.

What is claimed is:

1. An insulated conductor wire comprising a conductor wire and a surrounding insulation comprising an inner layer of a polyolefin compound and of cellular construction and an outer layer with a maximum thickness of 0.005 inches and of a non-cured and non-curable polyvinylchloride compound which includes a material compatible with the polyolefin of the inner layer, the inner layer having a substantially continuous skin which is bonded to the compatible material to bond the two layers together.

2. An insulated conductor wire according to claim 1 wherein the compatible material is a chlorinated polyethylene.

3. A method of forming an insulated conductor wire comprising extruding onto the conductor wire a molten polyolefin composition including a material which is expansible as a gas, upon removal of the extrusion pressure, to form the inner layer into a cellular structure; maintaining the material of the inner layer under extrusion pressure while extruding around it an outer layer of a molten noncurable polyvinylchloride composition including a desired amount of a material compatible with the polyolefin of the inner layer, the inner and outer layers intimately engaging one another along unbroken opposing surfaces with the material compatible with the inner layer bonding to the inner layer to form a bond between the layers throughout the area of the opposing surfaces; and reducing the pressure upon the two layers to cause the inner layer to form into a cellular structure while substantially maintaining the integrity of the surface of the inner layer and the bond throughout the areas of the opposing surfaces.

4. A method according to claim 3 comprising including within the polyvinylchloride composition a quantity of chlorinated polyethylene as the material compatible with the polyolefin of the inner layer, the chlorinated polyethylene bonding to the surface of the inner layer throughout the surface area.

* * * * *